Patented Jan. 15, 1946

2,393,022

UNITED STATES PATENT OFFICE 2,393,022

ALGIN-BITUMEN COMPOSITION AND ITS METHOD OF PREPARATION

Donald E. Clark, San Diego, Arnold B. Steiner, La Jolla, and Kenneth F. Gibsen, San Diego, Calif., assignors to Kelco Company, San Diego, Calif., a corporation of Delaware No Drawing. Application April 12, 1943, Serial No. 482,818

21 Claims. (Cl. 106—202)

The primary object of the invention is to provide a composition of asphalt or other bitumen with one or more of the insoluble alginates, such combinations having novel and valuable properties.

An object of the invention is to produce similar compositions of the insoluble alginates with waxes, resins, and other substances having certain properties in common with the solid and semisolid asphalts.

An object of the invention is to stabilize coatings and fabricated articles produced from asphalts and other substances which soften before melting and have an intrinsic tendency to become displaced or deformed under varying atmospheric conditions and circumstances of use.

An object of the invention is to produce coatings, sheets, layers, or threads consisting largely of a bitumen or a related material, which are highly resistant to crawling, creeping or other sources of deformation but which otherwise have substantially the properties of the bituminous constituent.

We have discovered that when an aqueous emulsion of an asphalt or a related substance is blended with a solution or aqueous paste of a water-soluble alginate and the mixture treated with a solution containing one or more of those cations which form water-insoluble alginates, the product is solid, tough, nontacky, and stable over a wide temperature range. These properties render the product suitable and valuable for a wide variety of uses, some of which will be considered in detail.

Definitions

The invention of method consists basically of three steps: first, the preparation of a suitable emulsion of the bituminous or related substance; second, the admixture with this emulsion of an aqueous solution or paste of a water-soluble alginate; third, the conversion of the soluble alginate to an insoluble form by treatment with a solution of a salt of a suitable metal. The product of the first step will be referred to as the emulsion, that of the second as the intermediate and that of the third as the final product or more briefly as the product. The third step, by which the fluent intermediate is converted into a solid, rubbery, insoluble mass is referred to as "setting."

The term "alginic substance" is used herein to include alginic acid and all of the alginates, except as it may be modified by the limitation to "soluble" or "insoluble" groups. The soluble alginic substances are the alginates of the alkali metals, magnesium, ammonium, and the amines. The insoluble alginic substances are the alginates of the remaining metals, and alginic acid.

References to solutions and to solubilities will be understood as referring to behavior with water, this being the sole solvent and vehicle contemplated in this disclosure.

The emulsions referred to herein are intimate dispersions of an emulsifiable organic solid in water, which may contain minor quantities of alkali, soap, clay, or other emulsifying agent, the aqueous being the external or continuous phase.

The emulsifiable organic solids to which our invention applies include the solid and semi-solid asphalts, both natural and artificial; thickened coal, lignite, stearine, and wood tars and the corresponding pitches; certain of the lower melting point waxes, including the solid paraffins; the resins formed by oxidation or polymerization of unsaturated hydrocarbons and certain other resins, both natural and synthetic. To be useful for our purpose the substance must be at least substantially solid at normal temperatures and it must be readily fusible, completely liquid at temperatures not much above the boiling point of water. It must be substantially insoluble in water and substantially inert to dilute solutions of the alkalis though it may, as in the case of the California asphalts, contain traces of acidic substances which react with alkalis to form emulsifying agents. Any organic substance having these properties may be converted into an emulsion adapted to the practice of our invention, the use to which the final product may be put varying with the remaining characteristics of the substance emulsified.

The substances referred to above as emulsifiable organic solids may have their properties modified by the addition of suitable agents prior to emulsification, or they may be blended before emulsifying, or emulsions of solids having diverse properties may be blended. In either case the product may be treated in the manner herein described to yield a product having modified properties.

For example, asphalts and pitches may be modified before emulsification, as by cutting back to reduce melting point and hardness or by admixture of harder grades or by air blowing. Emulsions of various types may be blended prior to addition of the soluble alginate, as for example an asphalt emulsion with emulsions of resin, wax, casein, soy bean protein or ester gum.

It will be remembered that when modifying agents are added to the emulsifiable solid prior to emulsification, the characteristics of the dispersed particles are modified, but where preformed emulsions of diverse types are blended, the final composite contains a mixture of discrete particles of unmodified emulsified solids.

Preparation of the emulsion

The emulsion may be prepared in any of the ways known in the prior art, provided only that the resultant emulsion is water-continuous, has a relatively high content of the solid and has a pH value not below 4.0 nor materially above 11.0. At hydrogen ion concentrations below pH 4.0 there might be a precipitation of alginic acid in the second step. Above about pH 11.0 the soluble alginate may show a tendency to gelatinize when admixed with the emulsion.

In making the product which is the primary object of the invention and which has petroleum asphalt as a base, we prefer to utilize the commercial emulsions almost everywhere available for road making and similar purposes. In the lack of such source of supply we may utilize any of the following methods of the prior art, at least one of which will be found adapted to the emulsification of any specific emulsifiable solid as above limited.

Quick-breaking emulsions of California or Mexican asphalt may be produced by agitating the molten asphalt with a hot and very dilute aqueous solution of an alkali metal hydroxide (see Montgomerie Patent 1,643,675). The applicability of this method is practically limited to the asphalts made from naphthenic petroleums and to a few of the pitches: it is nonfunctional with the paraffins and only occasionally adapted to emulsifying the waxes or resins.

The slow-breaking or mixing type of emulsion is usually formed by agitation with water in the presence of a fatty acid or resin soap as emulsifying agent (see Gabriel Patent 1,894,617). Any of the emulsifiable substances described above may be emulsified by the use of a soap or one of the many alternative agents described in the patent art.

In emulsions of the so-called clay type the emulsifying agent is a mineral colloid such as bentonite (see Kirschbraun Patent 1,506,371). In using this method care must be taken that the pH value of the emulsion is brought up to at least 4.0 and the method should not be used if the mineral matter would be objectionable in the finished product.

Commercial emulsions often contain various modifying or stabilizing agents such as gelatine, starch, casein, or tannin, usually in such small quantity as to be immaterial in the use of the emulsion for our purpose.

Preparation of the alginate solution

The free acid is a water-insoluble material nates both soluble and insoluble is fully described in United States Patents 1,814,981 to Thornley & Walsh, 2,036,922 to Clark & Green, 2,036,934 to Green, and 2,128,551 to Gloahec & Herter. Briefly summarizing: alginic acid (polymerized residues of d-mannuronic acid) is a major constituent of certain varieties of kelp, from which it is extracted by leaching with alkalis.

The manufacture of alginic acid and the algi- which forms freely water-soluble salts with the alkali metals sodium, potassium, lithium, rubidium, and cesium, with one only of the alkali earth metals (magnesium), with ammonium, and with the lower amines such as triethanol amine. These salts yield aqueous solutions characterized by high viscosity in a state of low concentration, the specific viscosity of 1% solutions ranging from 10 to 4000 or more centipoises at 20° C. The lower viscosities are produced by methods of manufacture which tend toward depolymerization.

The solution required in the second step may be of any one or a mixture of the above named soluble salts, though we prefer to use the sodium or ammonium salts. Both refined and crude alginates are articles of commerce, the former being of pale color and free from insoluble matter, the latter of darker color and containing from 20% to 30% (dry basis) of fine cellulosic fibre. Either of these may be dissolved in water in any convenient manner. The alginates, being colloidal compounds, require stirring for about fifteen to thirty minutes to thoroughly dissolve.

It is also possible, particularly in making a product having a base of bitumen, to use a crude algin paste made by digesting the kelp, with or without prior washing or bleaching, with an alkali such as sodium carbonate.

The specific viscosity of the alginate may be selected to vary the properties of the final product. Thus, in the use of an alginate of low viscosity (e. g., 10 to 20 centipoises in 1% solution) it is possible to introduce much more of the alginate into an intermediate of any given consistency. This results in a final product having the minimum of porosity. On the other hand, the strength and toughness of the final product are increased by using a high viscosity alginate (3000 to 4000 centipoises in 1% solution). A solution of a low viscosity alginate must contain about 5% to 6% by weight to match the viscosity of a 1% solution of a high viscosity alginate.

Preparing the intermediate

The intermediate is a simple mixture of the emulsion with the alginate solution and may be produced in any manner consistent with the viscosity of its components. The alginate solution will vary from a viscous fluid to a pasty consistency while the water-continuous emulsions are usually thinly fluid. Ordinarily simple stirring will be sufficient as the components are miscible mutually and also with water in any proportion.

The consistency to which the mixture is brought, which is controlled by regulating the total water content in relation to the specific viscosity of the alginate, is governed by the form in which the final product is desired and the manner in which the intermediate is applied to produce that form.

To produce a thin film the mixture must be strongly diluted; a film or coating produced by dipping may have its thickness controlled within limits by varying the viscosity of the bath. Mixtures to be spread or extruded should have a pasty consistency to permit them to retain their form into the final setting step.

With requirements so widely varied it is impossible to limit either the relation of alginate to dispersed solid or the relative water content of the mixture. In general terms, however, we have found that for coatings the most favorable relation of alginate to dispersed solid will range from 5:95 to 8:92 while for spreading or extrusion it may be of the order of 25:75. In either case the water content of the mixture may vary from 50% to approximately 80% by weight.

The intermediate may in many cases be prepared without an antecedent step of emulsification, by using the water soluble alginate as the emulsifying agent.

In this procedure an aqueous solution of the soluble alginate (preferably the sodium, potassium, or ammonium salt) is heated to a suitable temperature and the molten organic solid introduced into the solution with strong agitation. The temperature of the solution must be such that the molten organic solid will not be congealed on contact with it. Asphalts, road oils, waxes, and resins may be emulsified in this manner to great advantage. A portion or all of the quantity of soluble alginate required in the intermediate may be used for emulsifying. In the former case the remainder of the final quantity is added to the finished emulsion.

Forming and setting

Alginic acid forms insoluble salts with all of the metals other than those above named (the five alkali metals and magnesium). These insoluble salts are most readily produced by double decomposition between one of the soluble salts and a soluble salt of the desired metal. The rare metals, while functional, are obviously of no utility for the purpose of our invention and we prefer to make use of the calcium alginate produced by contacting the mixture with a solution of calcium chloride, though this is a preference only. For special purposes, such as introducing a toxic metal into the product, we may use salts of copper, zinc, or lead, or for other purposes, salts of barium, iron or aluminum.

The intermediate mixture is a dispersion of extremely minute, even microscopic particles of the asphalt or other emulsifiable solid in a vehicle containing a soluble alginate. When a layer of this intermediate is brought into contact with a solution of calcium chloride, for example, the insoluble calcium alginate is precipitated as a film surrounding the dispersed particles and binding them together or, if the quantity of alginate be sufficient, a matrix of the insoluble alginate is formed in which the dispersed particles are imbedded. The insoluble alginates form a tough, rubbery, and nonadhesive mass. These properties are lost on complete desiccation but the alginates retain water sufficient, under ordinary atmospheric conditions, to maintain the desirable properties unimpaired and the water retaining property may be exaggerated by suitable additions as will be described.

Before setting the intermediate in this manner it must first be brought to the form in which the final product is desired, this form being dependent on the type of use to which the product is to be put. For example, the product may be utilized in the form of sheets, rods, or threads in which case a thick mixture is extruded through an orifice. It may be spread as a softer paste on a backing sheet of paper, felt or cloth for use as the upper layer in prepared roofing or as an underlayer beneath linoleum. Films of the product may be formed by flowing a thin intermediate onto glass or polished metal surfaces from which the precipitated sheet may be stripped. Fabrics may be saturated with a thin intermediate, for instance cotton hose for conveying air. Fixed coatings may be produced on portable articles by dipping into a bath of the intermediate or on walls or floors by spraying. The surfaces of landing fields may be treated by flooding with the intermediate.

A product suitable for flooring may be produced by placing the intermediate in molds of the form of tiles and applying the setting treatment. For this purpose the intermediate should be liberally reinforced with ground cork, sawdust, rock dust, or diatomaceous earth.

A product containing many fine air cells and having considerable heat insulating value may be made by using an intermediate of relatively high viscosity and vigorously beating it to a froth with air prior to setting.

To whatever form the intermediate is brought, it is subjected to the setting contact with the salt solution. The manner of effecting this contact will vary with the form. Thus, rods and threads may be extruded below the surface of a calcium chloride bath in which they should remain for such time as to permit the salt to penetrate the mass and react with it throughout. Tackiness is destroyed almost instantly by the initial contact with the salt so that the product does not agglomerate in the bath. Coatings of all types may be dipped in such a bath if portable or sprayed, painted, or flooded with the solidifying solution if in fixed position.

The strength of the salt solution is not critical though extremely dilute solutions react very slowly while excessive concentrations may leave an undesirable amount of salt on the finished surface. This may be removed, if desired, by water washing or rinsing after solidification. The use of hot salt solution accelerates the setting action. We have found a weight concentration of calcium chloride ranging from 3% to 5% to be satisfactory for most purposes.

It is permissible to remove part of the water from the formed intermediate, before insolubilizing, by evaporation. The emulsion should not be allowed to break and separate its aqueous phase as this would cause loss in effectiveness of the alginate. This is not likely to occur as the alginates have a strong stabilizing effect on emulsions.

Drying of the intermediate prior to the setting treatment tends, to the extent to which this step is carried, to break down the emulsion and cause the separation of some of the dispersed particles. Where these particles consist of asphalt, pitch, or similar bitumen, this separation promotes adhesion of a coating on a hard surface such as a concrete but if carried too far may produce undesirable tackiness at the surface of the coating.

The insoluble alginates present in the solidified product retain a large proportion of water and in many cases it is desirable to partially dry the product. As the wet strength is high, the principal purpose of forced drying, as by circulation of hot dry air or passage through heating tubes, is to reduce the weight of the product for shipping. It is usually undesirable to heat the product above the melting point of the emulsifiable solid used, as this may cause deformation. Nor should the product be completely dried as under such treatment it tends to become brittle and to shrink. The most desirable practice, where time permits, is to allow the product to come spontaneously into equilibrium with the atmosphere at the point of manufacture or application. If forced drying is required it is desirable to dry down to a water content somewhat higher than the known equilibrium content of the particular product and allow atmospheric drying to complete the process. The once dried product will gain or lose water with changes in atmospheric humidity but will not desiccate to the point of shrinkage or brittleness in any but the driest climates.

For use under such conditions it is desirable to incorporate a small quantity of a hygroscopic agent in the product. Suitable agents are glycerine, sorbitol, the glycols, and various of the sugars. These substances may be dissolved in the intermediate or, if convenient, portable articles may be soaked in an aqueous solution of the agent.

*Modifications*

(A) Various comminuted solid substances may be added to modify the properties of the product. Thus, ground cork, sawdust, rock dust, or coarsely powdered diatomaceous earth may be used to impart a rough surface to coatings and to improve resistance to heat and to wear. Black emulsions can be made to yield a brownish, greenish, or gray product by the addition of suitable pigments. Fibrous materials increase both the wet and the dry strength. Finely powdered diatomaceous earth increases flow and creep resistance and in suitable proportions toughens the product, though an excess may render it short and brittle.

As the presence of notable quantities of solids often retards or inhibits emulsification, and as solid fillers are much more effective when present in the alginate phase of the product than when present in the emulsifiable solid, we prefer to add such fillers to the alginate solution, or to the mixed intermediate, or even to the finished emulsion, rather than to incorporate it into the emulsifiable solid prior to emulsification.

(B) While we prefer to use the metallic alginates for our purpose, in the manner above described, it is possible to produce good results, in some cases substantially equal results, by substituting the corresponding pectates. In this substitution the procedure is not changed in any respect, all the manipulations being made in the same manner. The pectates are less well understood than the alginates but have about the same solubilities and, in general, the same physical properties with the possible exception of the specific viscosities, which appear to be somewhat lower than those of the alginates under equal conditions.

The pectates may be prepared from citrus pectin in substantially the manner followed in preparing the alginates from kelp, to wit: by treating the insoluble albedo of citrus fruits with alkalis to form the soluble alkali metal pectates and precipitating these with heavy metal salts to produce the insoluble pectates (Wilson, Properties of Citrus Pectates . . ., Rubber Age, May 1942).

(C) Under some circumstances it may be difficult or even impossible to apply a solidifying solution to the formed intermediate. In such cases advantage may be taken of the property exhibited by certain of the heavy metals of forming a "complex" or coordination compound with ammonia.

In making use of this property we prepare an aqueous ammonium alginate complex with one of the heavy metals (for example, copper, silver, zinc, cadmium, mercury, iron, cobalt, nickel, or chromium) and mix this solution or paste with the emulsion as above described. The mixture (which corresponds to the intermediate above referred to) is then spread, sprayed, or otherwise brought into the desired form and position and is then allowed to stand until the ammonia has evaporated. By removal of the ammonia, which may be hastened by gentle heating if desired, the complex is broken down, the heavy metal alginate resumes its intrinsic insoluble form and the mixture sets spontaneously and without any treatment with calcium chloride or other insolubilizing solution.

The complex may be formed by adding to a solution of the heavy metal salt sufficient aqueous ammonia to redissolve the precipitate first formed and mixing with this solution a solution containing the calculated quantity of ammonium alginate. In this calculation the combining weight of alginic acid may be taken at 176 and the water content of commercial dry ammonium alginate at about 10%. Or if preferred, the heavy metal alginate may be precipitated from an alginate solution by the addition of a solution of the heavy metal salt and the precipitated alginate redissolved by the addition of aqueous ammonia. In either procedure at least a slight excess of ammonia should be present to avoid premature solidification due to loss of ammonia.

The heavy metal alginates have substantially the same physical properties as calcium alginate and the final product will be found to be substantially identical with that made from the same materials by solidification with calcium chloride. It will be remembered, however, that the toxic properties of some of the above named metals (particularly copper, zinc, and mercury) appear in the final product and that the metal used should be selected with a view to the desirability of toxicity in the product.

(D) Instead of using a metallic salt in the solidifying step to convert the soluble to an insoluble alginate it is possible to use an acid as the solidifying agent. This results in the liberation from the soluble salt of the insoluble free acid, alginic or pectic, as the case may be. These free acids have approximately the same physical properties as the corresponding insoluble salts.

As either alginic or pectic acid liberates carbon dioxide from the alkali metal carbonates, the acid used must have a relatively high dissociation constant but should be used in a state of considerable dilution. The cheaper mineral acids, sulfuric or hydrochloric, are recommended and the concentration should not exceed 5% and may be as low as 2% by weight. The solidified product may well be washed to free it from uncombined acid.

(E) Another method for setting the intermediate is to incorporate with it, just prior to the forming step, a sparingly soluble salt whose cations form insoluble alginates, as for example calcium sulfate, calcium glyconate, or calcium tartrate. This method, which is described in connection with the making of dental impression material in Patent 2,249,694 to Wilder, is useful in instances in which it is difficult or impossible to apply a calcium chloride or other setting solution to the formed intermediate.

In this procedure the calcium or other salt which reacts with the soluble alginate to produce the set is present in the intermediate, but passes into solution so slowly as to afford time for spreading or otherwise forming the intermediate. As the calcium is precipitated as insoluble calcium alginate as fast as its salt passes into solution, the reaction passes to completion with only a slight excess of the calcium salt.

When using calcium sulfate for this purpose, the setting rate may be controlled by selection of a sulfate having a suitable water-solubility. A precipitated sulfate or a natural gypsum is far more soluble than the dead-burned anhydrite, and thus the rate of solution and of setting may be controlled by varying the heat treatment to which the sulfate is subjected.

The rate at which the intermediate solidifies may also be controlled by using, in conjunction with a calcium or other salt as above described a salt (such as sodium oxalate or carbonate or trisodium phosphate) whose anions form an insoluble or very sparingly soluble salt with the cations (e. g. calcium) of the insolubilizing salt. Such retarding agent delays the insolubilization of the water-soluble alginate of the intermediate by preferentially precipitating the calcium salt, as it passes into solution, until the retarding agent is consumed. The setting reaction between the calcium salt and the alginate does not begin until the retarding agent is substantially consumed, and thus any time required for bringing the intermediate into a desired form may be obtained by regulating the dosage of the retarding agent.

*Examples*

1. Washed, chopped kelp (Macrocystis pyrifera) was cooked for approximately one hour at 200° F. with a sodium carbonate solution at pH 10. The product was a crude sodium alginate paste containing 8% solids.

The above paste was diluted to a concentration of 1.85% and 2,000 parts by weight were mixed with 750 parts of an emulsion of California petroleum asphalt of 60% asphalt content. The percentage composition of this mixture, as is and deducting water, is as follows:

|  | Percent |  |
|---|---|---|
| Crude sodium alginate | 1.35 | 7.6 |
| Asphalt, 40/100 pen. at 77° | 16.36 | 92.4 |
| Water | 82.29 | 0.0 |

This mixture was applied to a concrete surface and the coating treated for twenty minutes with a 5% solution of calcium chloride. The consistency of the mixture was that of a thick liquid, suitable for spraying or dipping. The treated coating was adherent to the concrete, free from tackiness and showed no tendency to creep on a vertical surface at temperatures up to the melting point of the asphalt used in making the emulsion.

2. To the mixture above described was added a quantity of finely powdered diatomaceous earth equal to 10% of the combined weight of alginate and asphalt. The percentage composition of the mixture with this addition was

|  | Percent |  |
|---|---|---|
| Crude sodium alginate | 1.35 | 7.0 |
| Asphalt | 16.36 | 83.9 |
| Diatomaceous earth powder | 1.77 | 9.1 |
| Water | 80.52 | 0.0 |

This mixture was somewhat shorter and less fluent than the mixture of Example 1 and could be spread in a thicker layer on a vertical surface. The solidified product, after treatment with calcium chloride solution, was definitely harder and more resistant than the product of the first example.

3. To 337 parts of the undiluted crude cook of Example 1 containing 8% sodium alginate were added 750 parts of the same emulsion. The composition of this mixture varied from that of the first example only in the relation of water to solids, being

|  | Percent |  |
|---|---|---|
| Crude sodium alginate | 3.05 | 7.6 |
| Asphalt | 37.13 | 92.4 |
| Water | 59.82 |  |

This composition was much more pasty than the preceding, is of suitable consistency for spreading on a paper or fabric base, and remains in position in a layer of any desired thickness up to and during the solidifying step.

4. A commercial unrefined sodium alginate marketed under the trade name "Kelgum" was dissolved in water to form a 7% solution and this solution mixed with a 60% asphalt emulsion. The percentage composition of this mixture was

|  | Percent |  |
|---|---|---|
| Unrefined sodium alginate | 2.19 | 5.0 |
| Asphalt | 41.67 | 95.0 |
| Water | 56.14 |  |

This mixture was a little more fluent than that of Example 3 and the solidified product was slightly less tough.

5. To 312 parts of the undiluted crude cook of Example 1, containing 8% sodium alginate, were added 58 parts of the above 60% emulsion of a 40 penetration asphalt and 67 parts of a 60% emulsion of a 200 penetration asphalt. The resultant mixture had the following composition:

|  | Percent |  |
|---|---|---|
| Crude sodium alginate | 5.72 | 25.0 |
| Asphalt, 40 penetration | 9.15 |  |
| Asphalt, 200 penetration | 8.01 | 17.16 | 75.0 |
| Water | 77.12 |  |

This mixture, which was thickly pasty or plastic, was extruded through a ¼" circular orifice into a bath of 5% calcium chloride solution. The resultant rod-like product was allowed to soak for thirty minutes in the salt solution to permit solidification throughout, then drained, partially dried, and allowed to come into equilibrium with the atmosphere.

The product thus finished was very tough and flexible, slightly resilient, and stable over a wide temperature range. At 150° F. it did not soften nor did the asphalt separate to cause surface stickiness. Under prolonged exposure at 32° F. the product remained flexible and showed no tendency to crack when bent. A product of this type when formed into a horizontal sheet is proof against creeping or ridging under continued rolling pressure.

6. 100 parts of commercial refined ammonium alginate and 60 parts cupric sulfate ($CuSO_4.5H_2O$) were separately dissolved in water and 60 parts 26° aqua ammonia added to the copper sulfate solution, after which the two solutions were mixed.

60 parts paraffin wax of 110° melting point were emulsified in 40 parts water containing 1½% by weight of ammonium oleate, equal to 1% of the weight of paraffin. The product was a pale-colored, fluid emulsion.

The mixed alginate-copper solution and the emulsion were then blended in such proportions as to give the following composition:

|  | Percent |  |
|---|---|---|
| Copper alginate | 0.50 | 6.0 |
| Paraffin | 7.83 | 94.0 |
| Water | 91.67 |  |

The mixture was then sprayed in thin films onto tree bark and green vegetation. On standing until the odor of ammonia disappeared the films had solidified and were then somewhat waxy in consistency and firmly adherent. These films are both toxic and impervious to boring and chewing insects, do not wash off in heavy rain, do not burn new leaf and protect against most varieties of fungus.

7. 10 parts of commercial ammonium alginate were dissolved in 180 parts water, the solution heated to about 180° F., and 130 parts of 200 penetration asphalt added in the molten form with strong agitation.

6 parts cupric sulfate ($CuSO_4.5H_2O$) were dissolved in 30 parts water and 6 parts 26° aqua ammonia added to form the ammonia-copper complex. This solution was then mixed with the cooled emulsion of asphalt in ammonium alginate solution. The mixture thus formed has the following composition:

|  | Percent |  |
|---|---|---|
| Ammonium alginate | 2.8 | 6.9 |
| Copper ammonia complex | 1.7 | 4.2 |
| Asphalt | 35.9 | 88.9 |
| Water | 59.6 |  |

8. To 200 parts sodium alginate paste containing 8% solids were added 60 parts of a 60% asphalt emulsion. To this intermediate were added 18 parts trisodium phosphate ($Na_3PO_4.12H_2O$) followed by 45 parts precipitated calcium sulfate ($CaSO_4.2H_2O$).

The mixture was thoroughly blended and applied to a flat surface. In about one hour the reaction had proceeded to the point at which the coating was substantially solid and was not dislodged on contact with water. Partial drying of the coating completed the reaction and produced a dense and tough coating.

The above examples are illustrative only and are not intended to limit in any manner the range of utility of the invention.

We claim as our invention:

1. The method of producing heat-stable, water-insoluble, solid bodies which consists substantially in bringing a preformed, plastic body of a water-continuous emulsion containing a major proportion of an emulsifiable, thermoplastic organic solid and a minor proportion of a water-soluble salt of alginic acid into superficial contact with an aqueous solution of a salt of a metal whose ions form a water-insoluble salt with alginic acid, and thereby substantially solidifying the entire mass of said preformed body.

2. The method of producing heat-stable, water-insoluble, solid bodies which comprises: preparing a plastic composition comprising a water-continuous emulsion of an emulsifiable, thermoplastic, organic solid, a water-soluble salt of alginic acid and a suspended, finely comminuted, water-insoluble solid; manipulating said plastic composition into a body of desired physical form; contacting the surface of said formed body with an aqueous solution of a salt of a metal whose ions form a water-insoluble salt with alginic acid, and thereby substantially solidifying said formed body.

3. A method substantially as and for the purpose set forth in claim 2, in which said finely comminuted solid is a pigment capable of altering the color of said plastic composition.

4. A method substantially as and for the purpose set forth in claim 2, in which said finely comminuted solid is diatomaceous earth.

5. The method of producing heat-stable, water-insoluble bodies which comprises: preparing a plastic composition comprising a water-continuous emulsion of an emulsifiable, thermoplastic, organic solid together with a water-soluble salt of alginic acid; manipulating said plastic composition into a body of desired physical form, and solidifying said plastic body by contact with an aqueous solution of a salt of a metal whose ions form water-insoluble salts with alginic acid.

6. A method substantially as and for the purpose set forth in claim 5, including a step of partially drying said plastic body prior to said step of solidification.

7. A method substantially as and for the purpose set forth in claim 5, including a step of at least partially drying said solidified body at superatmospheric temperature following said step of solidification.

8. A method substantially as and for the purpose set forth in claim 5, in which said desired physical form is a coating on a water-insoluble support.

9. A method substantially as and for the purpose set forth in claim 5, in which the step of manipulating said plastic composition into a body of desired physical form and the step of solidification are performed substantially simultaneously by extruding said emulsion through an orifice into a bath of said aqueous solution.

10. The method of producing heat-stable, water-insoluble, solid bodies which comprises: preparing a plastic composition comprising a water-continuous emulsion of an emulsifiable, thermoplastic, organic solid together with a water-soluble salt of an acid selected from the group consisting of alginic acid and pectic acid; manipulating said plastic composition into a body of desired physical form, and solidifying said plastic body by surface contact with an aqueous solution of a salt of a metal whose ions form water-insoluble salts with alginic acid and with pectic acid.

11. A method substantially as and for the purpose set forth in claim 5, in which said water-soluble salt of alginic acid is sodium alginate.

12. A method substantially as and for the purpose set forth in claim 5, in which said water-soluble salt of alginic acid is ammonium alginate.

13. A method substantially as and for the purpose set forth in claim 5, in which said salt of a metal is calcium chloride.

14. The method of producing heat-stable, water-insoluble, solid bodies which comprises: emulsifying an emulsifiable, thermoplastic, organic solid in an aqueous solution of a water-soluble salt of alginic acid and thereby producing a plastic, water-continuous emulsion; manipulating said emulsion into a body of desired physical form, and solidifying said plastic body by contact with an aqueous solution of a salt of a metal whose ions form water-insoluble salts with alginic acid.

15. A heat-stable, water-insoluble, solid body consisting substantially of a nonresilient, thermoplastic, organic solid substance intimately dispersed throughout a continuum consisting substantially of a substance selected from the group consisting of the water-insoluble metallic alginates and pectates, the dry weight of said continuum not exceeding 11.1% of the total dry weight of said solid body.

16. A solid body substantially as set forth in claim 15, in which said emulsifiable organic solid is a solid bitumen.

17. A solid body substantially as set forth in claim 15, including a minor proportion of a finely comminuted, water-insoluble, mineral substance.

18. A solid body substantially as set forth in claim 15, including a minor proportion of finely comminuted diatomaceous earth.

19. A solid body substantially as set forth in claim 15, including a minor proportion of an organic hygroscopic agent.

20. A neat-stable, water-insoluble, solid body consisting substantially of a nonresilient, thermoplastic, organic solid intimately dispersed throughout a continuum consisting substantially of a water-insoluble metallic salt of alginic acid, the dry weight of said continuum not exceeding 11.1% of the total dry weight of said solid body.

21. A solid body substantially as set forth in claim 20, in which said salt of alginic acid is calcium alginate.

DONALD E. CLARK.
ARNOLD B. STEINER.
KENNETH F. GIBSEN.

Certificate of Correction

Patent No. 2,393,022.                                                                 January 15, 1946.

DONALD E. CLARK ET AL.

It is hereby certified that errors appear in the printed specification of the above numbered patent requiring correction as follows: Page 2, first column, line 61, for "The free acid is a water-insoluble material" read *The manufacture of alginic acid and the algi-*; line 70, for "The manufacture of alginic acid and the algi-" read *The free acid is a water-insoluble material*; and that the said Letters Patent should be read with these corrections therein that the same may conform to the record of the case in the Patent Office.

Signed and sealed this 21st day of May, A. D. 1946.

[SEAL]

LESLIE FRAZER,
*First Assistant Commissioner of Patents.* comminuted, water-insoluble, mineral substance.

18. A solid body substantially as set forth in claim 15, including a minor proportion of finely comminuted diatomaceous earth.

19. A solid body substantially as set forth in claim 15, including a minor proportion of an organic hygroscopic agent.

20. A neat-stable, water-insoluble, solid body consisting substantially of a nonresilient, thermoplastic, organic solid intimately dispersed throughout a continuum consisting substantially of a water-insoluble metallic salt of alginic acid, the dry weight of said continuum not exceeding 11.1% of the total dry weight of said solid body.

21. A solid body substantially as set forth in claim 20, in which said salt of alginic acid is calcium alginate.

DONALD E. CLARK.
ARNOLD B. STEINER.
KENNETH F. GIBSEN.

Certificate of Correction

Patent No. 2,393,022. January 15, 1946.

DONALD E. CLARK ET AL.

It is hereby certified that errors appear in the printed specification of the above numbered patent requiring correction as follows: Page 2, first column, line 61, for "The free acid is a water-insoluble material" read *The manufacture of alginic acid and the algi-*; line 70, for "The manufacture of alginic acid and the algi-" read *The free acid is a water-insoluble material*; and that the said Letters Patent should be read with these corrections therein that the same may conform to the record of the case in the Patent Office.

Signed and sealed this 21st day of May, A. D. 1946.

[SEAL]

LESLIE FRAZER,
*First Assistant Commissioner of Patents.*